July 7, 1936.  J. H. REDMOND  2,046,969
METHOD OF RESISTANCE SPOT WELDING
Filed Dec. 31, 1935
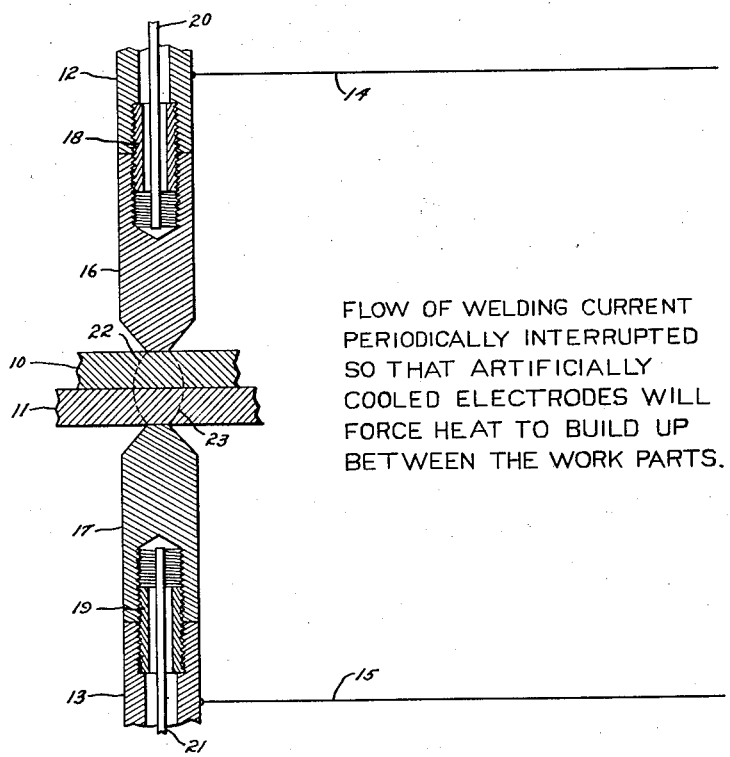
FLOW OF WELDING CURRENT PERIODICALLY INTERRUPTED SO THAT ARTIFICIALLY COOLED ELECTRODES WILL FORCE HEAT TO BUILD UP BETWEEN THE WORK PARTS.
Inventor:
James H. Redmond,
by Harry E. Dunham
His Attorney.

Patented July 7, 1936

2,046,969

UNITED STATES PATENT OFFICE 2,046,969

METHOD OF RESISTANCE SPOT WELDING

James H. Redmond, Schenectady, N. Y., assignor to General Electric Company, a corporation of New York Application December 31, 1935, Serial No. 56,918

6 Claims. (Cl. 219—10)

My invention relates primarily to an improved procedure for the resistance spot welding of thick metal parts.

In resistance spot welding, the parts to be united are pressed between electrodes having a comparatively small contact therewith and a current of electricity is passed through the electrodes. This current, flowing through the resistance of the parts between the electrodes, brings them to a welding temperature and the pressure upon the electrodes causes welding to take place between the parts over a small area or spot the size of which varies with the size of the electrodes and the length of time the current is allowed to flow.

Very heavy currents are required to produce welding temperatures in thick metal parts not only because of the increased thermal capacity of the parts but also on account of the large area of the spot or path through which the current flows. Furthermore the very high current density at the points of contact between the electrodes and the parts to be welded increases the difficulty of keeping the electrodes sufficiently cool to prevent their softening and deformation. In order to prevent this softening and deformation it has already been proposed artificially to cool the electrodes and to shape the electrodes so that their small work engaging surfaces are adequately reinforced by enlarged portions of the electrodes which are subjected to this artificial cooling. Even so, due to the concentration of heat at the small contact areas between the electrodes and the work parts, the metal at these areas is often rendered molten before a weld is produced between the work parts. These conditions may be so aggravated that the contact surfaces of the welding electrodes are so deformed or destroyed after a very few welding operations that subsequent welding operations cannot be performed without renewing or repairing the contact surfaces of the electrodes.

I have discovered that if the flow of welding current is periodically interrupted during a spot welding operation on thick metal parts, the heat may be forced to build up between the work parts and prevented from building up at the contact surfaces between the electrodes and the work parts.

I have also discovered that when welding heavy metal parts, that welds may be made more closely adjacent one another than is possible with an uninterrupted flow of welding current.

I have also fund that by periodically interrupting the flow of welding current the capacity of spot welding machines, with regard to the thickness of the metal parts welded thereby, may be greatly increased.

I have also determined that it is possible to weld with a periodically interrupted flow of welding current strips of metal whose widths are slightly greater than the widths of the contact areas between the welding electrodes and the strips without destroying the strips during the welding operation. This advantage is obtained whether the strips are thin or thick and in this respect my invention is not limited to the welding of thick metal parts.

My method of resistance spot welding will be more fully described with reference to the accompanying diagrammatic drawing.

In this drawing the work, that is the parts to be welded 10 and 11, is subjected to a periodically interrupted flow of welding current and to a welding pressure through the agency of artificially cooled electrodes 12 and 13. These electrodes are connected to a source of welding current by conductors 14 and 15. The electrodes are provided with detachable tips 16 and 17 whose work engaging surfaces have been greatly reduced in order to increase the current density in the work parts at the point where the welding operation is to be performed. These tips are attached to the body of the electrode by means of a threaded connection with couplings 18 and 19. These tips are artificially cooled by a suitable cooling medium supplied thereto through conduits 20 and 21. These conduits extend through passageways in the electrodes and are suitably spaced therefrom to provide an exhaust passageway for the cooling medium.

The path of flow of the welding current through the work parts has been indicated in the drawing by dotted lines 22 and 23. It will be noted that the current density where the electrode engages the work parts is greater than the current density at the joint between the work parts. Consequently, the surfaces of the work parts heat at a greater rate than the surfaces of the work parts that are in engagement with one another and the artificially cooled electrodes are not able to dissipate this heat sufficiently to prevent the electrodes being raised to a softening temperature. This results in a rapid destruction of the work engaging surfaces of the electrodes. These surfaces frequently become molten and portions thereof are blown out along with the molten metal of the work parts during the welding operation. As a result of this the electrodes are so deformed after a few welding operations that the areas of contact between them and the work are either pitted or greatly enlarged and thus rendered unsuited for producing in the work at the point of welding the concentration of welding current needed for performing a welding operation.

By periodically interrupting the flow of welding current and making the interruption periods of sufficient duration to permit the electrodes to maintain their work engaging surfaces below temperatures at which the metal of the electrode is readily deformed, the operating life of the electrode is greatly increased and the throwing out of molten metal between the electrode and the work parts is completely eliminated. The periodic application of welding current, however, in no way interferes with the production of the weld as the repeated application of current causes an accumulation of heat at the joint between the parts which finally builds up to a welding temperature. In fact by using an interrupted flow of welding current welds may be made more closely adjacent one another in thick metal parts than is possible when operating with an uninterrupted flow of welding current. After the first weld it may, however, be necessary to increase the number of periods of current flow for succeeding welds. Heretofore it has been considered impossible to place welds in thick aluminum parts closely adjacent to one another but with my procedure this is successfully accomplished.

By resorting to my procedure the work engaging surfaces of artificially cooled electrodes may be so reduced in area as to be unsuited for welding with an uninterrupted flow of welding current and this makes it possible to obtain higher current densities in the work parts with smaller sized welding machines. With a periodically interrupted flow of welding current the heat resulting from the flow of the welding current is forced to build up between the work parts to a welding temperature at their contacting surfaces and at the same time prevented from building up at the contact surfaces between the electrodes and the work parts.

Metal strips having a width slightly greater than the widths of the contact areas of the welding electrodes may be welded to one another or to other objects of greater widths without destroying the strips during the welding operation. If a continuous flow of welding current is used the strips are melted and the metal blown out between the electrodes before a weld can be obtained. The interrupted flow of welding current causes the heat to build up internally at the joint to a welding temperature before any portion of the strip has become molten. Either thin or thick strips may be thus welded although the procedure is most effective on thick strips.

After a weld has been made between thick metal parts, I have found that it is often necessary to maintain the welding pressure until the metal of the weld has acquired sufficient strength to withstand any tendency of the parts to spring apart. When the flow of welding current is terminated the metal of the plates at the weld is in a tacky or plastic condition and it is often necessary to maintain the pressure for an interval sufficient to compensate for shrinkage of the metal in cooling and to allow the weld to acquire sufficient strength to withstand any tendency of the plates to spring apart due to their warping while being heated by the flow of welding current.

The welding pressure, current density and frequency of interruption will depend in large measure on the character of the electrodes, the material of which they are made, and the size of their work engaging surfaces as well as the nature and thickness of the work parts. The best procedure for any application can only be determined by experiment, keeping in mind the underlying factors above disclosed. When welding ferrous metals a quarter of an inch or more in thickness, I have found that the welding current may be supplied to the work parts until the surfaces of said parts in engagement with the electrodes has been heated to a dull red, and that the flow of current should be interrupted until this dull red disappears before again applying the welding current. Materials such as brass and aluminum because of their greater thermal conductivity and lower electrical resistance require a greater number of periodic applications of welding current than do ferrous metals. These metals also weld at lower temperatures than ferrous metals and, consequently, the surfaces of the parts cannot be brought to a red heat by each period of flow of welding current as when welding ferrous metals.

The periodically interrupted flow of welding current may be obtained in many ways. For example, the welding circuit may be periodically opened through the agency of a mechanically operated switch or an arc discharge device. Instead of reducing the current to zero by thus interrupting the welding current the flow of current may be reduced to a low non-welding value by periodically increasing the impedance of the welding circuit. Thus in defining my invention where reference has been made to periodically interrupting the flow of welding current it is to be understood that the flow of current may be completely interrupted periodically or periodically reduced to a low value. It is, of course, apparent from what has been disclosed above that it is desirable to reduce the flow of welding current periodically to a very low value if the circuit is not opened, since this will make it possible to follow the teachings of my invention more effectively by preventing the heat from building up at the contact areas between the electrodes and the parts to be welded while forcing it to build up to a welding value between the parts.

Either direct or alternating current may be used. When alternating current is used it is to be understood that the periodic interruptions to the flow of welding current is independent of the frequency of the source. That is the welding current flows for a number of cycles and is interrupted or greatly reduced for a number of cycles in accordance with my invention and such significance is to be given to "periodically interrupted flow of welding current" when used in describing my invention.

What I claim as new and desire to secure by Letters Patent of the United States, is:

1. The method of resistance spot welding thick metal parts which comprises subjecting said parts to a periodically interrupted flow of welding current and to a welding pressure through the agency of artificially cooled electrodes whose surfaces engaging said parts are so reduced in area that an uninterrupted flow of welding current therethrough would produce destructive deformation temperatures at their points of contact with said parts, the interruption periods to the flow of welding current being sufficiently long to permit said artificially cooled electrodes to maintain their surfaces engaging said parts below deformation temperatures while the heat is forced to build up between said parts to a welding temperature.

2. The method of resistance spot welding thick metal parts which comprises subjecting said parts to a periodically interrupted flow of welding current and to a welding pressure through the agency of artificially cooled electrodes whose surfaces engaging said parts are so reduced in area that an uninterrupted flow of welding current therethrough would produce destructive deformation temperatures at their points of contact with said parts, the interruption periods to the flow of welding current being sufficiently long to permit said artificially cooled electrodes to maintain their surfaces engaging said parts below deformation temperatures while the heat is forced to build up between said parts to a welding temperature, and maintaining said welding pressure until the weld thus produced has cooled and acquired sufficient strength to withstand any tendency of said parts to spring apart.

3. The method of resistance spot welding work parts one-quarter of an inch or more in thickness which comprise subjecting said work parts to a periodically interrupted flow of a welding current and to a welding pressure through the agency of artificially cooled electrodes, the interruptions to the flow of welding current relative to the magnitude of the welding current being such that the heat resulting from the flow of welding current is forced to build up to a welding temperature between the contacting surfaces of said work parts and is prevented from building up at the contact surfaces between said electrodes and said work parts.

4. The method of electric resistance spot welding ferrous metal parts a quarter of an inch or more in thickness which comprises subjecting said parts to a welding pressure through the agency of artificially cooled electrodes and heating said parts to a welding temperature by periodically interrupting the flow of welding current through said electrodes and said parts between said electrodes so that the surfaces of said parts in engagement with said electrodes are periodically heated to a dull red and then cooled before being again raised to a dull red as the welding operation proceeds due to the heat built up in said parts between their contacting surfaces.

5. The method of making closely adjacent resistance spot welds in thick metal parts which comprises subjecting said parts to a periodically interrupted flow of welding current and to a welding pressure through the agency of artificially cooled electrodes, the number of periods of current application being greater for subsequent welds than for the initial weld and the interruptions to the flow of welding current relative to the magnitude of the welding current being such that the heat resulting from the flow of welding current is forced to build up to a welding temperature between the contacting surfaces of said parts and is prevented from building up at the contact surfaces between said electrodes and said parts.

6. The method of resistance spot welding metallic strips having a width slightly greater than the width of the contact area of the welding electrode in engagement therewith during the welding operation which comprises subjecting said strip to a periodically interrupted flow of welding current and to a welding pressure while artificially cooling said electrode in engagement therewith, the interruptions to the flow of welding current relative to the magnitude of the welding current being such that the heat resulting from the flow of welding current is forced to build up to a welding temperature internally between the surface of said strip and the surface of the part to which it is to be united and is prevented from building up in the edges of said strip or at the contact surface between said strip and said electrode.

JAMES H. REDMOND.